(12) United States Patent
Wang et al.

(10) Patent No.: US 11,784,942 B2
(45) Date of Patent: *Oct. 10, 2023

(54) DYNAMIC ALLOCATION OF EDGE NETWORK RESOURCES

(71) Applicant: International Business Machines Corporation, Armonk, NY (US)

(72) Inventors: Yue Wang, Beijing (CN); Gang Tang, Nanjing (CN); Xin Peng Liu, Beijing (CN); Wei Wu, Beijing (CN); Zheng Li, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/717,996

(22) Filed: Apr. 11, 2022

(65) Prior Publication Data

US 2023/0062334 A1   Mar. 2, 2023

Related U.S. Application Data

(63) Continuation of application No. 17/412,521, filed on Aug. 26, 2021, now Pat. No. 11,336,585.

(51) Int. Cl.
*H04L 47/783* (2022.01)

(52) U.S. Cl.
CPC ................. *H04L 47/783* (2013.01)

(58) Field of Classification Search
CPC .... H04L 47/783; H04L 47/52; H04L 43/0894
USPC ........................................................ 709/226
See application file for complete search history.

(56) References Cited

U.S. PATENT DOCUMENTS

| 8,706,833 | B1* | 4/2014 | Bergant | G06F 16/1756 709/215 |
| 8,959,203 | B1* | 2/2015 | Miller | H04L 47/00 709/224 |
| 9,325,597 | B1* | 4/2016 | Clasen | H04L 41/18 |
| 10,320,644 | B1* | 6/2019 | Chen | H04L 41/147 |
| 2007/0203714 | A1* | 8/2007 | McEnroe | G06Q 30/0601 705/26.1 |
| 2019/0208445 | A1* | 7/2019 | Klatsky | H04L 65/1069 |

* cited by examiner

*Primary Examiner* — Meng Vang
(74) *Attorney, Agent, or Firm* — Garg Law Firm, PLLC; Rakesh Garg; Michael O'Keefe

(57) ABSTRACT

An embodiment includes determining, based on historical data associated with a specific task, a baseline bandwidth recommendation for completing the specific task. The embodiment assigns, for a first time period, the specific task to a first computing device on a network. The embodiment allocates, for the first time period based on the baseline bandwidth recommendation, a first baseline bandwidth to the first computing device. The embodiment allocates, for the first time period, a portion of a shared buffer bandwidth as a first buffer bandwidth to the first computing device based on a weight value assigned to the specific task. The first buffer bandwidth combines with the first baseline bandwidth as a first total bandwidth for the specific task. The embodiment throttles, during the first time period, data packets associated with the specific task based on the first total bandwidth for the specific task.

20 Claims, 13 Drawing Sheets

DYNAMIC ALLOCATION OF EDGE NETWORK RESOURCES

BACKGROUND

The present invention relates generally to a method, system, and computer program product for network resource management. More particularly, the present invention relates to a method, system, and computer program product for dynamic allocation of edge network resources.

Edge computing refers to a distributed computing paradigm that performs data processing at "the edge" of a network. The "edge" of a network generally refers to computing devices—referred to as edge devices—at the logical extreme of the network that generate and use data. Examples of edge devices include such things as smart phones and Internet of Things (IoT) devices. The edge of a network also generally includes network infrastructure that is relatively close to edge devices compared to a cloud server. For example, edge computing may include data processing on a local edge server that is on-premises, or in a data center that is geographically situated near edge devices, such as within the same city, metropolitan area, country, etc., between a cloud server and the edge devices. The goal with edge computing is to improve the performance of applications on edge devices by reducing the time required for application data to be transferred across a network for processing.

SUMMARY

The illustrative embodiments provide for dynamic allocation of edge network resources. An embodiment includes determining, based on historical data associated with a specific task, a baseline bandwidth recommendation for completing the specific task. The embodiment also includes assigning, for a first time period, the specific task to a first computing device on a network. The embodiment also includes allocating, for the first time period based on the baseline bandwidth recommendation, a first baseline bandwidth to the first computing device. The embodiment also includes allocating, for the first time period, a portion of a shared buffer bandwidth as a first buffer bandwidth to the first computing device based on a weight value assigned to the specific task, where the first buffer bandwidth combines with the first baseline bandwidth as a first total bandwidth for the specific task. The embodiment also includes throttling, during the first time period, data packets associated with the specific task based on the first total bandwidth for the specific task. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
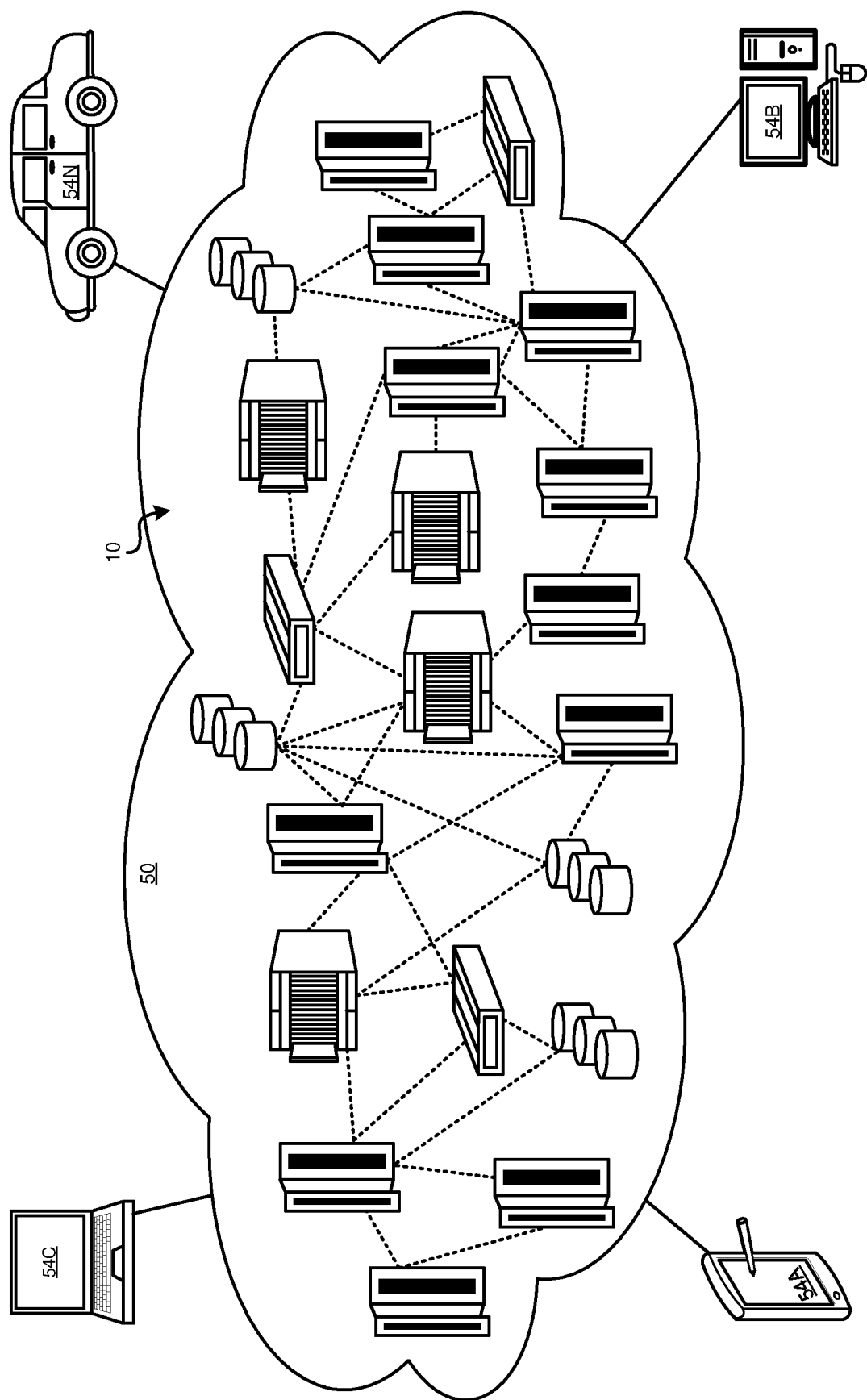
FIG. 1 depicts a cloud computing environment according to an embodiment of the present invention.

Recent years have seen a growing trend towards adopting edge computing with an aim towards improving data-intensive applications. This has led to relatively large numbers of low-cost commodity network appliances or nodes that typically have limited computing power, e.g., limited processors, processor speed, memory, storage, network bandwidth, and the like. This limited computing power is compensated by the use of distributed processing across several devices that are relatively close from a networking perspective to allow for low-latency data transfers.

However, as the number of the edge devices increases, the complexity of edge networks also increases. Also, as the edge computing paradigm is adopted by a growing number of applications, the demand for bandwidth on edge networks also increases. As a result, there is a growing demand for effective management of edge network resources and utilization of edge networked resources and nodes to obtain improved network performance.

This demand growth combined with limited edge computing resources can be problematic as applications consume available bandwidth, especially during peak demand times and for higher priority applications that rely on relatively large amounts of bandwidth for acceptable performance. In addition, because of the distributed architecture of edge networks and devices, there is no single control point to enforce bandwidth management. Thus, bandwidth management techniques that rely on the presence of a single gateway are not applicable to edge networks where several devices are interconnected via many network access devices and share internal and external bandwidth.

The illustrative embodiments recognize when as a large number of edge devices are running numerous tasks with different priorities, the management complexity of the edge computing architecture increases significantly. Thus, illustrative embodiments address the need for resource allocation on the edge side to consider how to adapt to this increase in complexity. For example, illustrative embodiments provide for segmenting network resources according to demand, and dynamically allocating network resources to edge devices and their tasks. In addition, illustrative embodiments account for differences in priorities of edge tasks, and allow for allocation of additional bandwidth for high-priority tasks.

Thus, according to some illustrative embodiments, a resource allocation method is performed in a load-sensitive edge network. Embodiments of the method provide different resource allocations or restrictions for different tasks. A metadata store collects performance data for tasks given varying amounts of network resources and processes this data to predict an ideal amount of network resources for each of the tasks. As tasks are queued for execution by edge devices in the edge network, a bandwidth management service requests resource recommendations from the metadata store on a task by task basis. The metadata store responds with recommendations on a per task basis, when available, based on the predictions for ideal resource levels for each task.

In some embodiments, the resource allocation method simultaneously manages both baseline and buffer bandwidth resources based on tasks being performed using historic task performance data. The resource allocation method includes a cluster definer that defines clusters of edge devices to provide adequate bandwidth resources for each task. The edge devices include proxies that request allocation of buffer bandwidth to be added to the baseline bandwidth as needed for a task. The buffer is allocated in proportion to weights assigned to each task. The weights may be used to designate critical or high priority tasks by increasing the weights associated with these tasks. The increased weight increases the proportion of buffer that is allocated to important tasks, ensuring that important tasks are efficiently completed.

In some embodiments, the resource allocation method includes a throttler that enforces baseline bandwidth and buffer bandwidth limits by controlling the flow of data packets through an edge device proxy. The throttler receives network packets and makes determinations as to whether to propagate or delay the packets using a primary token bucket that is paired with a secondary token bucket. The primary token bucket collects tokens at a primary fill rate (e.g., r tokens per second) and the secondary token bucket collects tokens at a secondary fill rate (e.g., s tokens per second). The fill rates are set according to a token-bucket specification that sets the primary fill rate based on bandwidth allocation and sets the secondary fill rate based on buffer allocation.

When the throttler receives a network packet, the throttler checks the primary bucket for a threshold number of tokens (which may be one or more tokens) required to propagate the network packet. If the threshold number of tokens are available, then the throttler propagates the network packet and the threshold number of tokens are discarded. If the threshold number of tokens are not available in the primary token bucket, the throttler checks the secondary token bucket for the remaining tokens needed to reach the threshold number of tokens.

In some embodiments, a resource allocation method manages allocation of bandwidth as an example of network resources. In some embodiments, the resource allocation method allocates bandwidth on a task-by-task basis for a specified series of time periods or "rounds." The length of time for each round may be a user-configurable value that is implementation-specific, for example depending on the types of tasks being performed and typical minimum time frames for completing tasks.

In some embodiments, the resource allocation method manages bandwidth allocation for a specified time period by dividing the total available bandwidth into two groups—baseline bandwidth and buffer bandwidth—and allocating bandwidth from each of the two groups according to mutually distinct allocation techniques. In an exemplary embodiment, the resource allocation method begins with the total available bandwidth, and first allocates baseline bandwidths for each task being performed during the specified time period. The resource allocation method allocates baseline bandwidths for each task based on historic data collected for the task being performed. Once the resource allocation method allocates the baseline bandwidths for each task, the resource allocation method designates the bandwidth that remains from the total available bandwidth as the total available buffer bandwidth. The resource allocation method then determines buffer bandwidth allocations for each task based on respective bandwidth requests and respective weight values.

In some embodiments, the resource allocation method collects performance data for tasks as the tasks are being completed by edge devices. The resource allocation method processes the collected performance data on a task by task basis to determine the basic network resources needed for each task to be properly completed. The resource allocation method aggregates the performance data on a per-task basis, and processes the performance data on a task by task basis to determine an ideal bandwidth allocation for each task. In some embodiments, the resource allocation method uses a mathematical model, such as an optimization algorithm, that processes the performance metrics for a given task and determines a minimum bandwidth that still yields acceptable performance, i.e., minimal network errors.

In some embodiments, the resource allocation method performs the processing of the performance data and derives network performance metrics for each of the tasks using the associated performance data. In various embodiments, the resource allocation method may gather any of a number of types of networking-related performance metrics from network devices, such as routers or edge devices. For example, such metrics may include the incoming and outgoing network traffic rates at a given host during a time interval (e.g., expressed in bytes or in packets), the number of network connections corresponding to various protocols such as TCP (Transmission Control Protocol) or UDP (User Datagram Protocol), the number of packets dropped during a time interval and the causes of the packet drops, the number of packets whose transmission was delayed due to enforcement of current bandwidth limits, the distributions of the sizes of the packets, the applications on whose behalf the traffic occurred to or from a given node, the clients on whose behalf the traffic was initiated, latencies associated with packet delivery, and/or the IP addresses of the endpoints involved in various transmissions.

In some embodiments, the resource allocation method determines a baseline bandwidth recommendation for each task using this performance metrics data and stores the baseline bandwidth recommendation in a metadata store. In some embodiments, the resource allocation method also stores task attributes with the baseline bandwidth recommendation. Task attributes may include such things as application type (e.g., video player or video conferencing), data type (e.g., file transfer or audio/video data), and/or protocol (e.g., TCP or UDP). This attribute information may be used to select a baseline bandwidth recommendation for an unfamiliar task by matching task attributes rather than matching the task itself.

When a new task is queued for execution, the resource allocation method defines a cluster of one or more edge devices to perform the task, allocates network resources to the cluster, sends the task assignment to cluster, and receives the task results from cluster once the task is completed. In some embodiments, the resource allocation method includes queries the metadata store for a baseline bandwidth recommendation based on task attributes rather than based on the task itself. The resource allocation method then notifies the edge devices in the assigned cluster of the task, and allocates a baseline bandwidth to the cluster for the task.

In some embodiments, the resource allocation method receives data packets associated with an assigned task and throttles the data packets according to allocated baseline bandwidth and buffer bandwidth. In some embodiments, the resource allocation method generates primary tokens into a primary token bucket, which holds or keeps a count of all the primary tokens. In some embodiments, the resource allocation method also generates secondary tokens into a secondary token bucket, which holds or keeps a count of all the secondary tokens.

In some embodiments, the resource allocation method uses the primary token bucket to enforce the allocated baseline bandwidth and uses the secondary token bucket to enforce the allocated buffer bandwidth. At the beginning of each round, the resource allocation method generates primary tokens for the current round and starts to propagate the corresponding amount of data packets. Also, at the beginning of each round, the resource allocation method may allocate secondary tokens, if necessary, for the current or future rounds. The exact correlation between the tokens and the bandwidths may vary and may be implementation specific depending on such things as user preference or typical packet size. For example, in some embodiments, the primary and secondary tokens may correlate to a volume of data, such as one token per byte, one token per kilobyte, or some other unit of measure.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
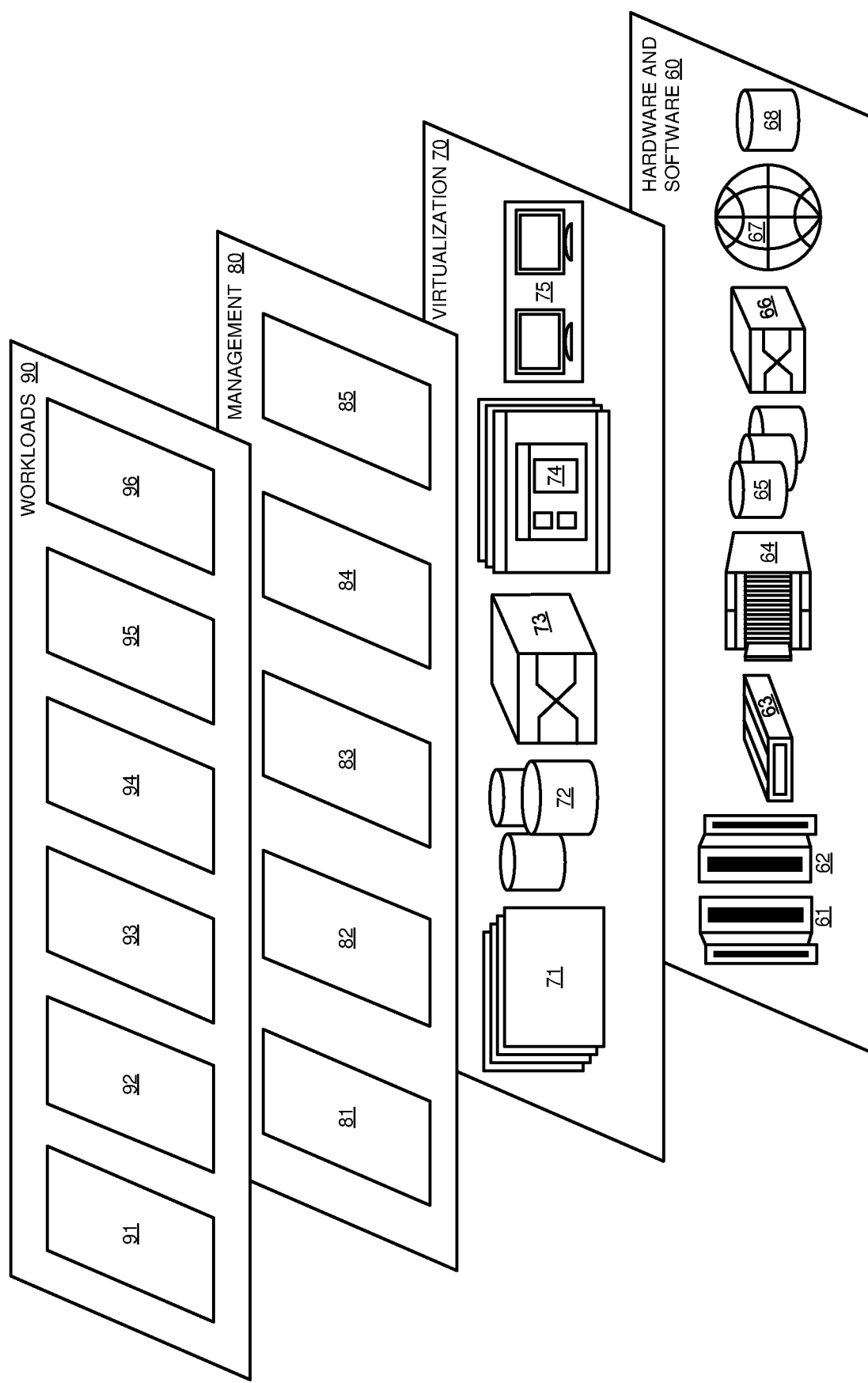
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and edge resource allocation processing 96.

Figure 3:
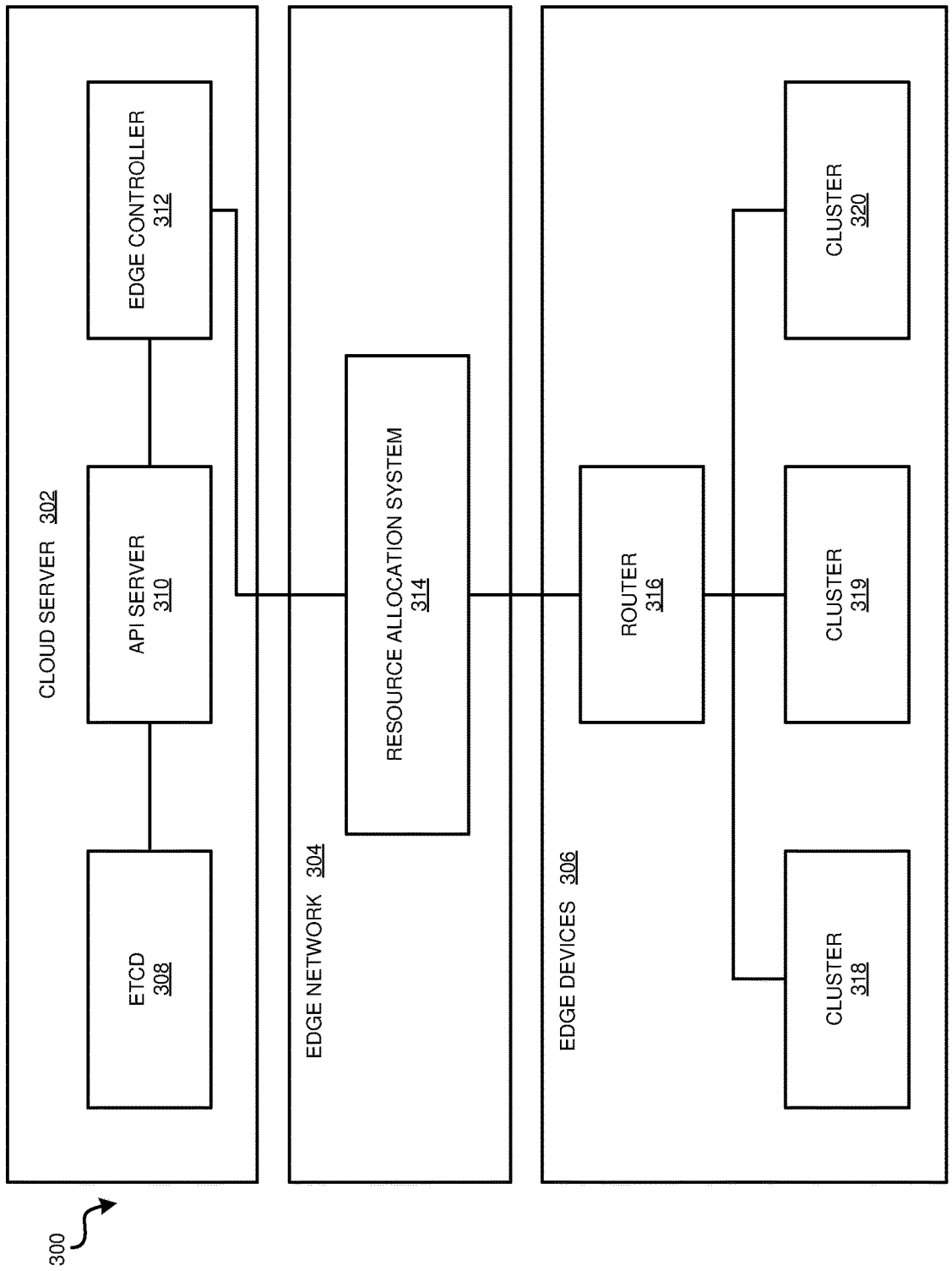
FIG. 3 depicts a block diagram of an example edge computing environment in accordance with an illustrative embodiment.

With reference to FIG. 3, this figure depicts a block diagram of an example edge computing environment 300 in accordance with an illustrative embodiment. In the illustrated embodiment, the edge computing environment 300 includes a cloud server 302 in communication with an edge network 304 and a plurality of edge devices that are collectively referred to as edge devices 306. In some embodiments, the edge network 304 includes a resource allocation system 314 that is deployed in workloads layer 90 of FIG. 2 providing edge network processing 96.

In the illustrated embodiment, the cloud server 302 includes an ETCD 308, an API server 310, and an edge controller 312. The ETCD 308 is a distributed key value store that provides a reliable way to store data across a cluster of machines. The API server 310 provides access to network applications like the resource allocation system 314. The edge controller 312 performs the primary network administration and control function of the edge devices 306.

The edge controller 312 is in communication with the resource allocation system 314 of the edge network 304. The resource allocation system 314 manages the allocation of network resources to edge devices 306. The edge devices 306 operate in clusters 318-320 of one or more computing devices to complete assigned tasks. The clusters 318-320 communicate with the resource allocation system 314 via a router 316. The resource allocation system 314 allocates network resources to each of the clusters 318-320 on a task-by-task basis based on the task being performed and communicates this resource allocation information to the clusters 318-320.

In some embodiments, the resource allocation system 314 manages allocation of bandwidth as an example of network resources. In some embodiments, the resource allocation system 314 allocates bandwidth on a task-by-task basis for a specified series of time periods or "rounds." The length of time for each round may be a user-configurable value that is implementation-specific, for example depending on the types of tasks being performed and typical minimum time frames for completing tasks.

In some embodiments, the resource allocation system 314 manages bandwidth allocation for a specified time period by dividing the total available bandwidth into two groups—baseline bandwidth and buffer bandwidth—and allocating bandwidth from each of the two groups according to mutually distinct allocation techniques. In an exemplary embodiment, the resource allocation system 314 begins with the total available bandwidth, and first allocates baseline bandwidths for each task being performed during the specified time period. The resource allocation system 314 allocates baseline bandwidths for each task based on historic data collected for the task being performed. Once the resource allocation system 314 allocates the baseline bandwidths for each task, the resource allocation system 314 designates the bandwidth that remains from the total available bandwidth as the total available buffer bandwidth. The resource allocation system 314 then determines buffer bandwidth allocations for each task based on respective bandwidth requests and respective weight values.

Figure 4:
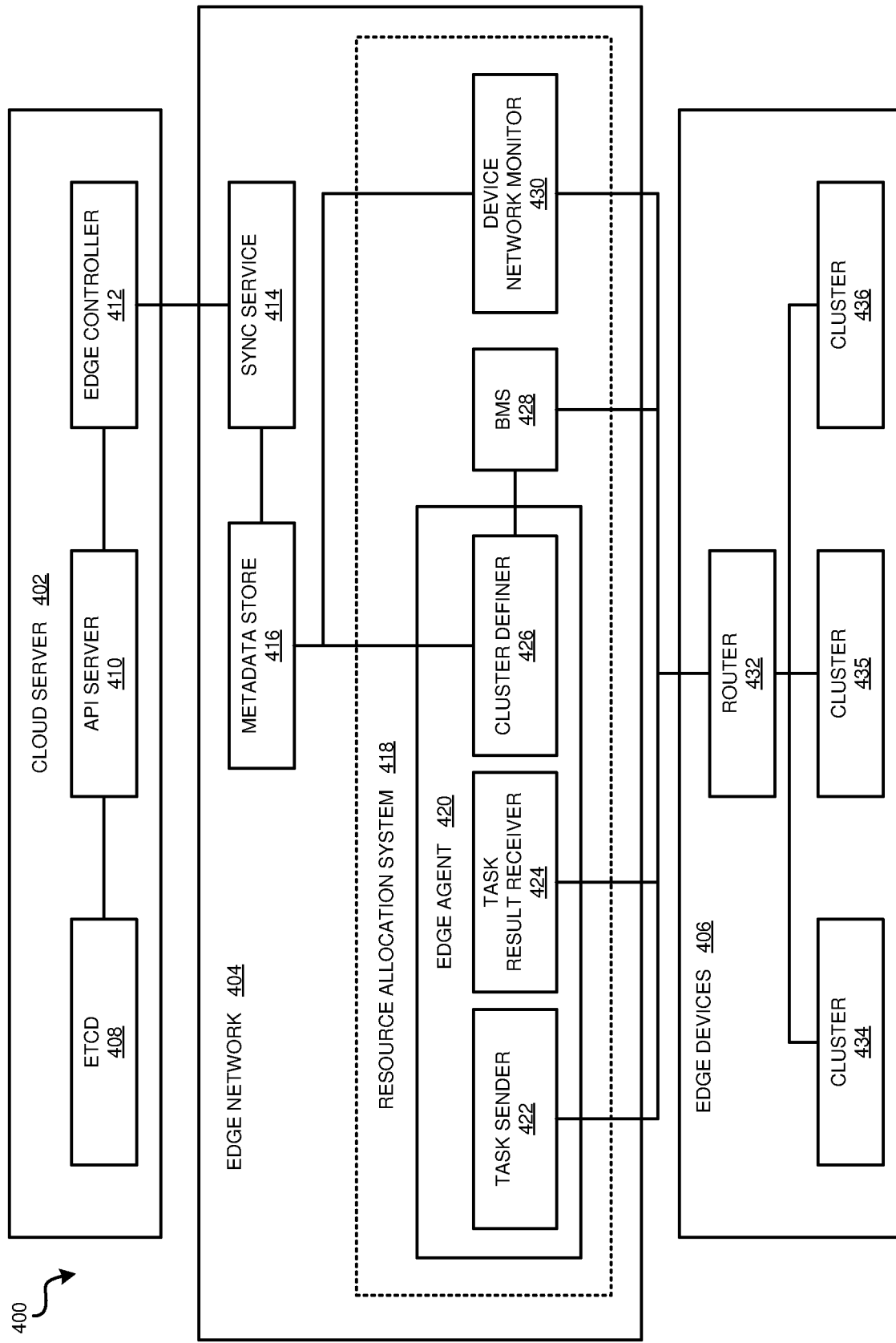
FIG. 4 depicts a block diagram of an example edge computing environment in accordance with an illustrative embodiment.

With reference to FIG. 4, this figure depicts a block diagram of an example edge computing environment 400 in accordance with an illustrative embodiment. The edge computing environment 400 includes a cloud server 402 in communication with an edge network 404 and a plurality of edge devices that are collectively referred to as edge devices 406. The edge network 404 includes a resource allocation system 418. In a particular embodiment, the resource allocation system 418 is an example of the resource allocation system 314 of FIG. 4.

In the illustrated embodiment, the cloud server 402 includes an ETCD 408, an API server 410, and an edge controller 412. The ETCD 408 is a distributed key value store that provides a reliable way to store data across a cluster of machines. The API server 410 provides access to network applications like the resource allocation system 418. The edge controller 412 performs the primary network administration and control function of the edge devices 406.

The edge controller 412 is in communication with a sync service 414 of the edge network 404. The sync service 414 provides model management functionality, such as storing machine learning models for later deployment to edge devices 406 and to a metadata store 416.

In the illustrated embodiment, the resource allocation system 418 comprises a device network monitor 430, a Bandwidth Management Service (BMS) 428, and an edge agent 420. The edge agent 420 comprises a task sender 422, a task result receiver 424, and a cluster definer 426. In alternative embodiments, the resource allocation system 418 can include some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the device network monitor 430 collects performance data for tasks as the tasks are being completed by edge devices 406. The device network monitor 430 processes the collected performance data on a task by task basis to determine the basic network resources needed for each task to be properly completed. The device network monitor 430 aggregates the performance data on a per-task basis, and processes the performance data on a task by task basis to determine an ideal bandwidth allocation for each task. In some embodiments, the device network monitor 430 uses a mathematical model, such as an optimization algorithm, that processes the performance metrics for a given task and determines a minimum bandwidth that still yields acceptable performance, i.e., minimal network errors.

In some embodiments, the device network monitor 430 performs the processing of the performance data and derives network performance metrics for each of the tasks using the associated performance data. In various embodiments, the device network monitor 430 may gather any of a number of types of networking-related performance metrics from the router 432 and clusters 434-436 of edge devices 406. For example, such metrics may include the incoming and outgoing network traffic rates at a given host during a time interval (e.g., expressed in bytes or in packets), the number of network connections corresponding to various protocols such as TCP (Transmission Control Protocol) or UDP (User Datagram Protocol), the number of packets dropped during a time interval and the causes of the packet drops, the number of packets whose transmission was delayed due to enforcement of current bandwidth limits, the distributions of the sizes of the packets, the applications on whose behalf the traffic occurred to or from a given node, the clients on whose behalf the traffic was initiated, latencies associated with packet delivery, and/or the IP addresses of the endpoints involved in various transmissions.

In some embodiments, the device network monitor 430 determines a baseline bandwidth recommendation for each task using this performance metrics data and stores the baseline bandwidth recommendation in the metadata store 416. In some embodiments, the device network monitor 430 also stores task attributes with the baseline bandwidth recommendation. Task attributes may include such things as application type (e.g., video player or video conferencing), data type (e.g., file transfer or audio/video data), and/or protocol (e.g., TCP or UDP). This attribute information may be used to select a baseline bandwidth recommendation for an unfamiliar task by matching task attributes rather than matching the task itself.

When a new task is queued for execution by edge devices 406, the edge agent 420 defines a cluster (e.g., cluster 434) of one or more edge devices 406 to perform the task, allocates network resources to the cluster 434, sends the task assignment to cluster 434, and receives the task results from cluster 434 once the task is completed. In the illustrated embodiment, the edge agent 420 includes a task sender 422, a task result receiver 424, and a cluster definer 426 for performing these functions. The cluster definer 426 evaluates the queued task and defines a cluster of edge devices 406 to perform the task, for example based on various task attributes. The cluster definer 426 also queries the metadata store 416 for a baseline bandwidth recommendation for the queued task. In some embodiments, the cluster definer 426 queries the metadata store 416 for a baseline bandwidth recommendation based on task attributes rather than based on the task itself. The cluster definer 426 informs the task sender 422 regarding task assignments and informs the BMS 428 regarding the baseline bandwidth recommendations for the task. The task sender 422 then notifies the edge devices 406 in the assigned cluster (e.g., cluster 434) of the task, and the BMS 428 allocates a baseline bandwidth to the cluster 434 for the task.

Figure 5:
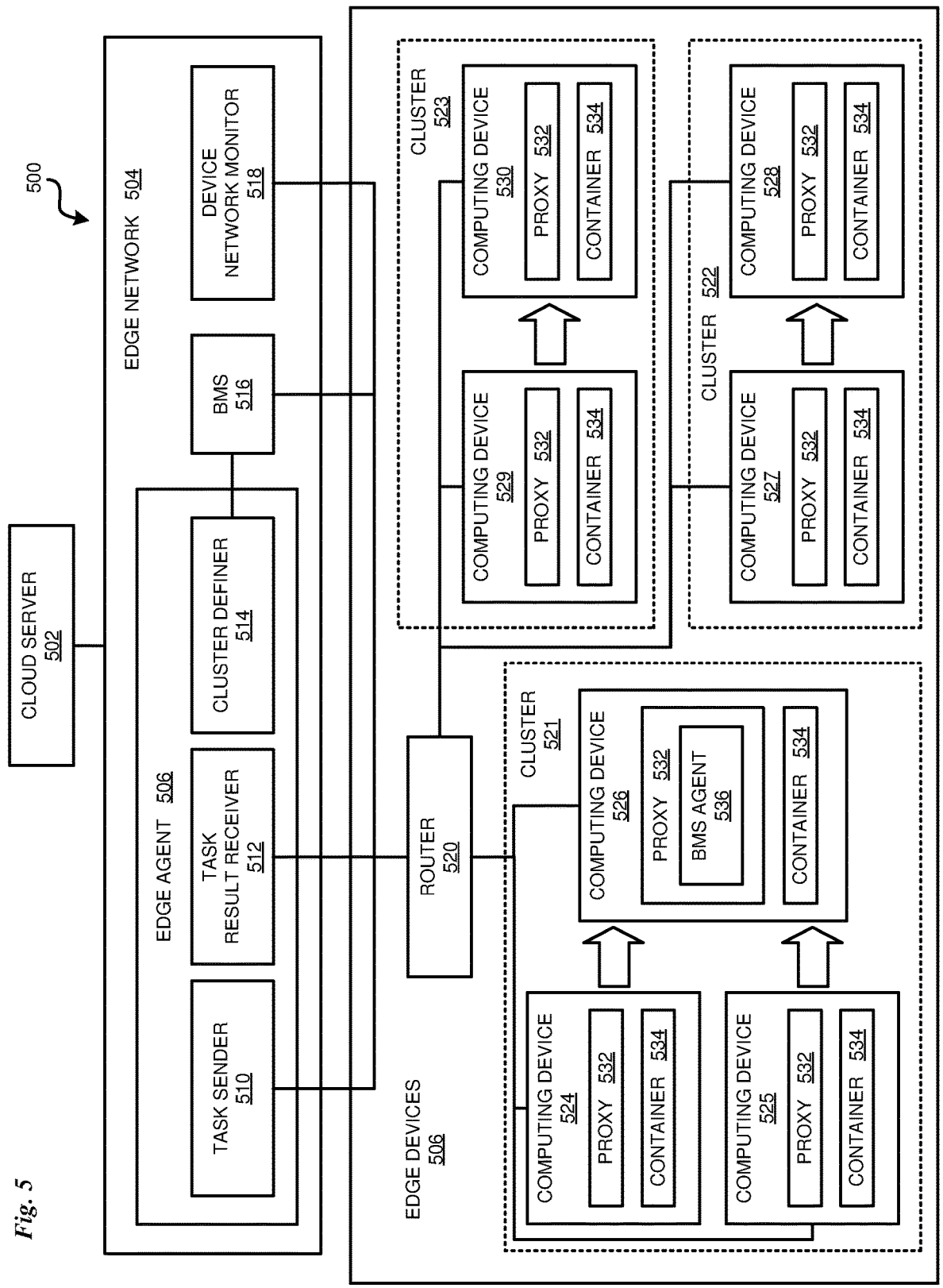
FIG. 5 depicts a block diagram of an example edge computing environment in accordance with an illustrative embodiment.

With reference to FIG. 5, this figure depicts a block diagram of an example edge computing environment 500 in accordance with an illustrative embodiment. The edge computing environment 500 includes a cloud server 502 in communication with an edge network 504 and a plurality of edge devices that are collectively referred to as edge devices 506. The edge network 504 includes an edge agent 508, a BMS 516, and a device network monitor 518. In a particular embodiment, the edge agent 508, BMS 516, and device network monitor 518 are examples of the edge agent 420, BMS 428, and device network monitor 430, respectively, of FIG. 4, and the cloud server 502 is an example of cloud server 402 of FIG. 4. Also, in a particular embodiment, the task sender 510, task result receiver 512, and cluster definer 514 are examples of the task sender 422, task result receiver 424, and cluster definer 426 of FIG. 4.

In the illustrated embodiment, the edge devices 506 include illustrated computing devices 524-530 that communicate with the edge network 506 via a router 520. The computing devices 524-530 are organized into three clusters 521-523. The computing devices 524-526 form cluster 521, the computing devices 527-528 form cluster 522, and the computing devices 529-530 form cluster 523.

In the illustrated embodiment, each of the computing devices 524-530 includes a container 534, which is illustrative of a platform for hosting one or more containerized applications. A containerized application is an executable units of software in which application code is packaged, along with its libraries and dependencies, in common ways so that it can be run on a variety of different hosts. In alternative embodiments, the computing devices 524-530 host one or more virtual machines for executing applications.

In the illustrated embodiment, each of the computing devices 524-530 also includes a proxy 532. As shown for computing device 526, each proxy 532 also includes a BMS agent 536. The BMS agent 536 allows the proxy 532 to communicate with the BMS 516. For example, in some embodiments, the BMS 516 includes a BMS API, and the BMS agents 536 are configured to communicate with the BMS 516 using the BMS API. The BMS agents 536 receive baseline bandwidths from the BMS 516, which the proxy 532 uses to throttle network traffic. The BMS agent 536 may also request buffer bandwidth from the BMS 516 according to embodiments discussed herein.

FIGS. 6-11 show an example of a series of successive time periods, also referred to as rounds, in which the computing devices 524-530 are assigned tasks and various bandwidths as the rounds progress. This is a non-limiting example provided for explanatory purposes only. In FIGS. 6-11, the parenthetical notation above each of the computing devices 524-530 is representative of (baseline bandwidth, requested buffer bandwidth). For this example, the total available bandwidth for each is 1100, which is only provided as an example for the sake of explanation. The exact bandwidth values and units of measure will be implementation-specific and may therefore vary depending on several factors. As an example, the bandwidths shown in FIGS. 6-11 may be expressed as bits per second (bps), kilobits per second (Kbps), megabits per second (Mbps), or some other units of measure.

Figure 6:
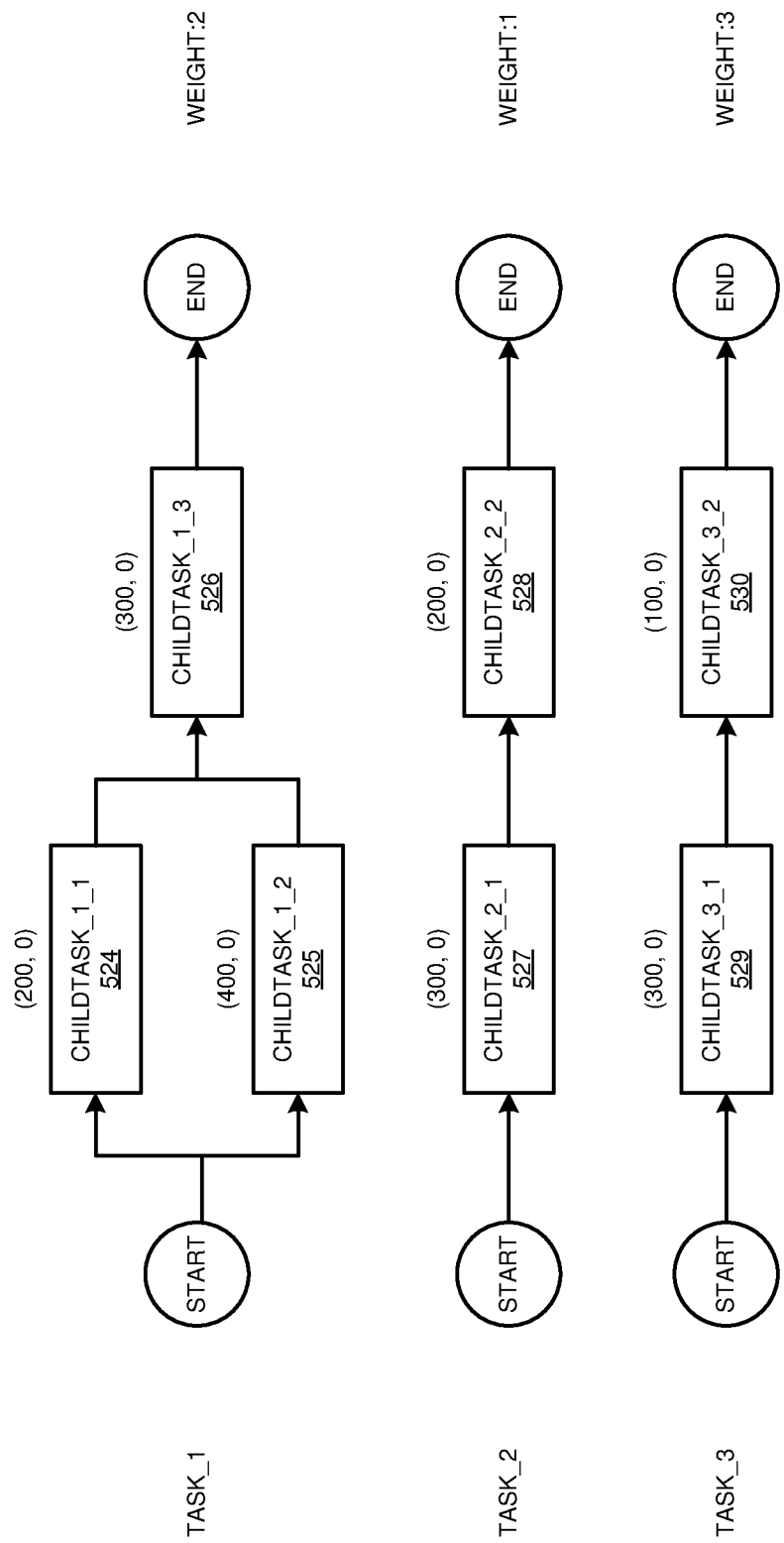
FIG. 6 depicts a block diagram of computing devices with example task and bandwidth assignments in accordance with an illustrative embodiment.

With reference to FIG. 6, this figure depicts a block diagram of computing devices 524-530 with example task and bandwidth assignments in accordance with an illustrative embodiment. In the illustrated embodiment, the computing devices 524-530 correspond with computing devices 524-530 of FIG. 5.

In the illustrated embodiment, three tasks have been assigned to the computing devices 524-530. As shown in FIG. 5, the cluster definer 514 (shown in FIG. 5) has grouped computing devices 524-530 into three clusters such that computing devices 524-526 form a cluster assigned Task_1, computing devices 527-528 form a cluster assigned Task_2, and computing devices 529-530 form a cluster assigned Task_3. Also, the BMS 516 (shown in FIG. 5) has allocated baseline bandwidths to each of the computing devices 524-530 (shown as the first value in each parenthetical pair). Each task has multiple child tasks that are assigned to individual computing devices. The child task notation indicates task and child task as ChildTask_(task number)_(child task number) such that ChildTask_1_1 indicates the first child task of the first task, ChildTask_1_2 indicates the second child task of the first task, ChildTask_2_1 indicates the first child task of the second task, and so on.

In FIG. 6, the BMS 516 has allocated baseline bandwidths to each computing device for performing a respective assigned child task. Specifically, the BMS 516 has allocated baseline bandwidths of 200 to computing device 524, 400 to computing device 525, 300 to computing device 526, 300 to computing device 527, 200 to computing device 528, 300 to computing device 529, and 100 to computing device 530.

Figure 7:
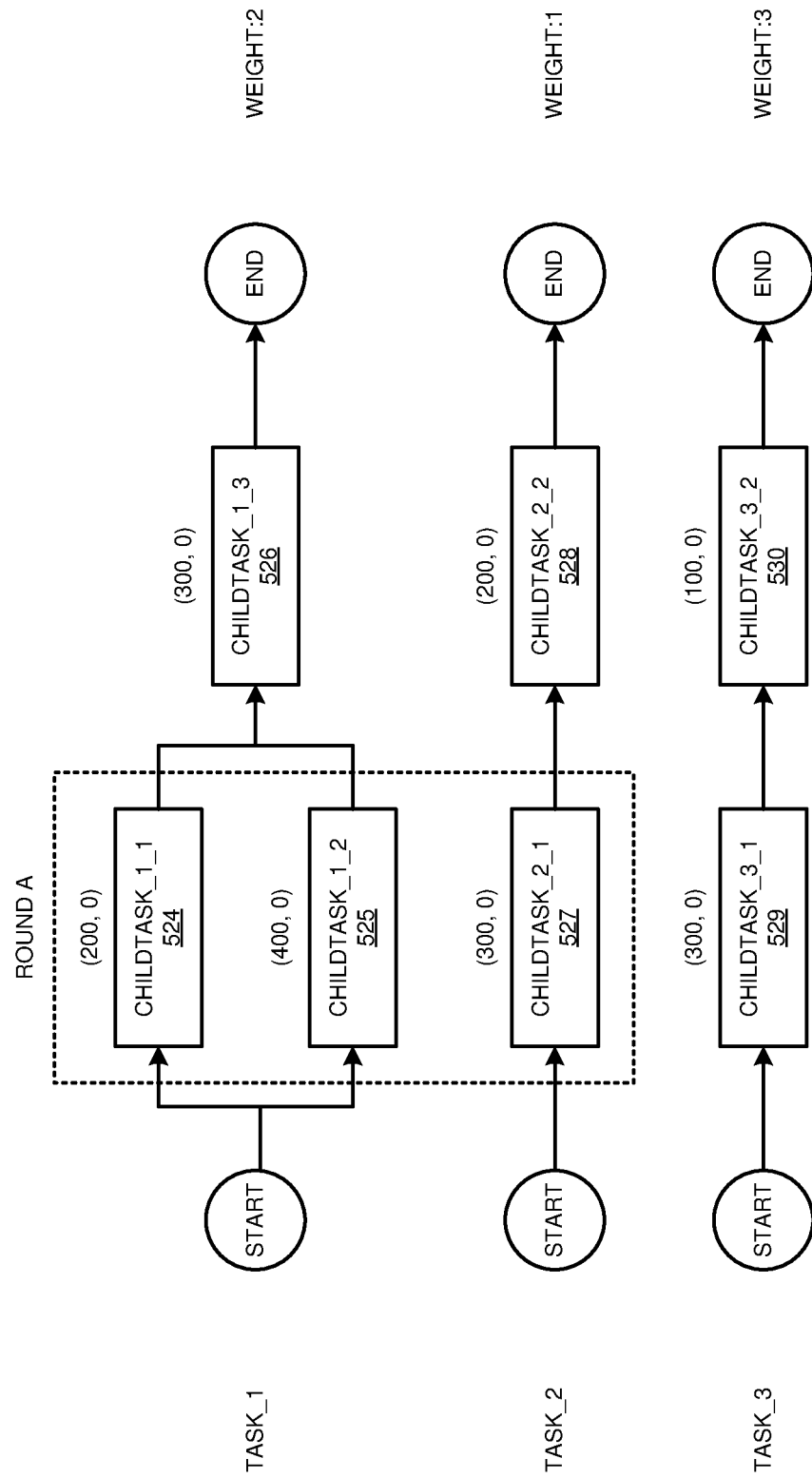
FIG. 7 depicts a block diagram of computing devices with example task and bandwidth assignments during a first round in accordance with an illustrative embodiment.

With reference to FIG. 7, this figure depicts a block diagram of computing devices 524-530 with example task and bandwidth assignments during a first round in accordance with an illustrative embodiment. In the illustrated embodiment, the computing devices 524-530 correspond with computing devices 524-530 of FIG. 5.

In the illustrated embodiment, three child tasks are in progress during a first time period designated as Round A. This illustrates an example of tasks being performed with only baseline bandwidth allocations from the BMS 516. During this first round (Round A), the total bandwidth in use is the sum of the three baseline bandwidths (200+400+ 300=900), which is satisfactory in that it does not exceed the total available bandwidth of 1100 per round.

Figure 8:
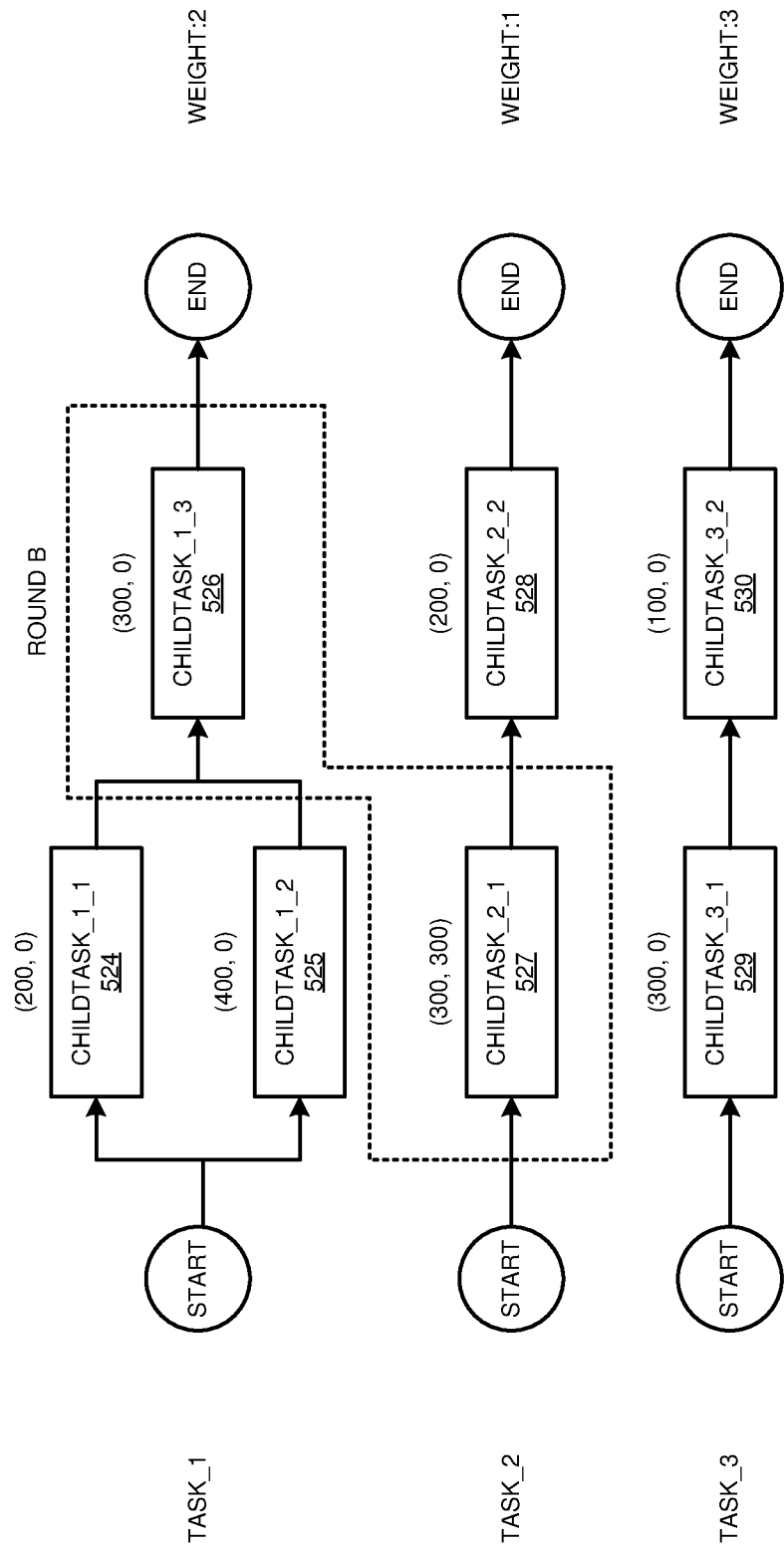
FIG. 8 depicts a block diagram of computing devices with example task and bandwidth assignments during a second round in accordance with an illustrative embodiment.

With reference to FIG. 8, this figure depicts a block diagram of computing devices 524-530 with example task and bandwidth assignments during a second round in accordance with an illustrative embodiment. In the illustrated embodiment, the computing devices 524-530 correspond with computing devices 524-530 of FIG. 5.

In the illustrated embodiment, two child tasks are in progress during a second time period designated as Round B. This illustrates an example of a child task (ChildTask_2_1) that may extend for more than one time period. Also, in the example shown in FIG. 8, one child task has been assigned both baseline bandwidth and buffer bandwidth, while another has been assigned only baseline bandwidth.

For this example, suppose only computing device 527 sent a request to the BMS 516 for buffer bandwidth, and that request was for an additional 300. In this example, the baseline bandwidths are 300 and 300 for a total of 600. Since the total available bandwidth is 1100, this means there is 1100–600=500 available buffer bandwidth. Since only computing device 527 requested buffer bandwidth, the buffer bandwidth allocation is determined by the BMS 516 according to expressions (1) and (2) below.

$$\text{Allocatable Buffer} = \text{(Buffer Total} - \text{Buffer Allocated)} * (Wi/(W1 + W2 + \ldots + Wn)) \quad (1)$$

$$\text{Final buffer} = \begin{cases} \text{Requested buffer (if Requested buffer} <= \text{Allocatable buffer)} \\ \text{Allocatable buffer (if Requested buffer} > \text{Allocatable buffer)} \end{cases} \quad (2)$$

In expression (1), W refers to weight value of a child task for which buffer is being requested, with Wi being the weight of the child task for which buffer is being calculated, and W1 is the weight of the first child task for which buffer is requested, W2 is the weight of the child second task for which buffer is requested, and so on to Wn being the weight of the nth child task for which buffer is requested, where buffer is being requested for n child tasks in a round. Here, since only computing device 527 is requesting buffer, the weight values become 1 (weight for ChildTask_2_1/weight for ChildTask_2_1=1/1=1). Also, no other buffer is allocated, so "Buffer Allocated"=0, making the Allocatable buffer=500. Then, for expression (2), the requested buffer of 300 is less than the allocatable buffer of 500, so the final buffer for ChildTask_2_1 will be the requested buffer of 300.

Figure 9:
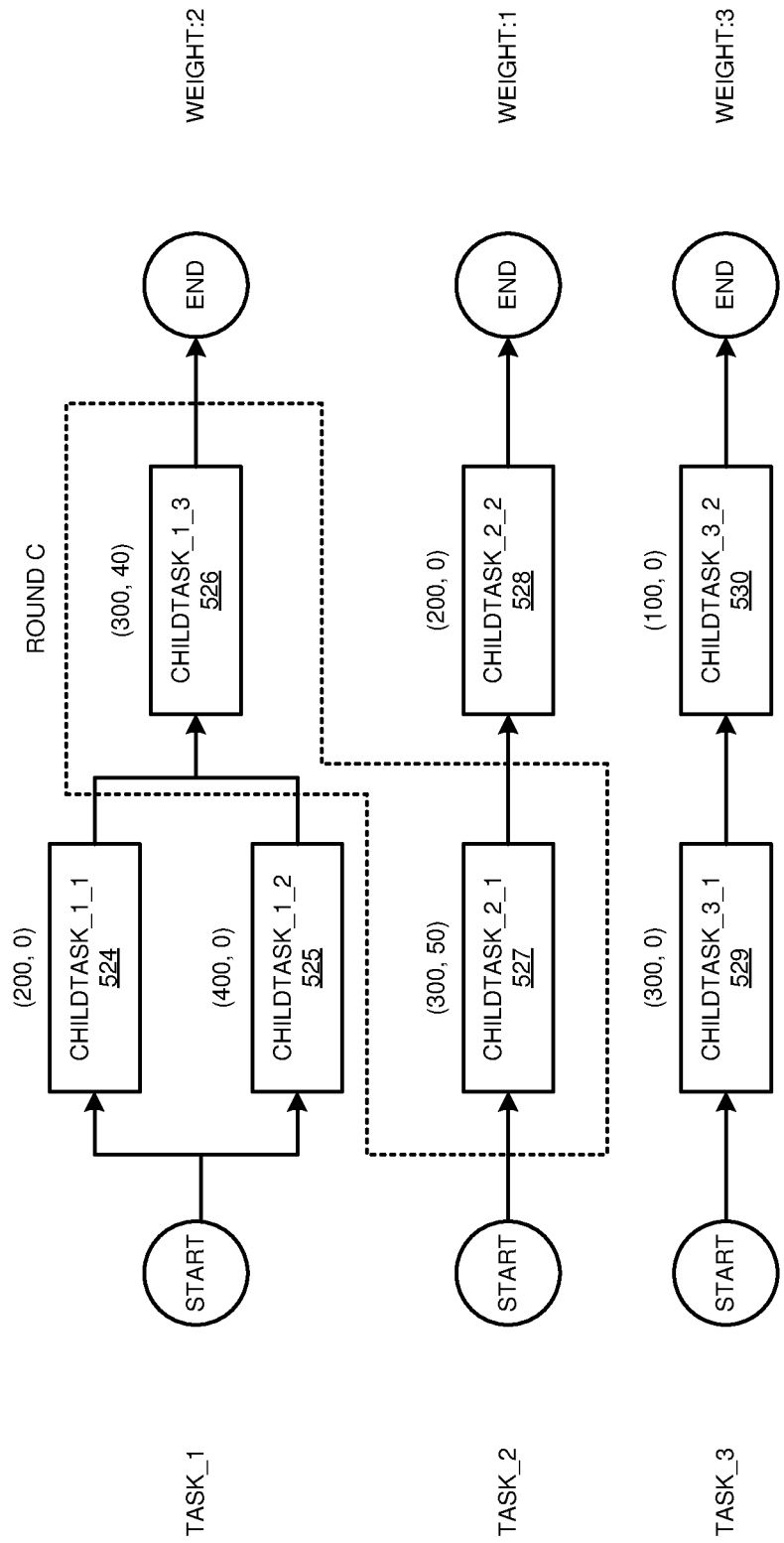
FIG. 9 depicts a block diagram of computing devices with example task and bandwidth assignments during a third round in accordance with an illustrative embodiment.

With reference to FIG. 9, this figure depicts a block diagram of computing devices 524-530 with example task and bandwidth assignments during a third round in accordance with an illustrative embodiment. In the illustrated embodiment, the computing devices 524-530 correspond with computing devices 524-530 of FIG. 5.

In the illustrated embodiment, two child tasks are in progress during a third time period designated as Round C. This illustrates an example of a multiple child tasks (ChildTask_2_1 and ChildTask_1_3) that may extend for more than one time period. Also, in the example shown in FIG. 9, both child tasks has been assigned both baseline bandwidth and buffer bandwidth.

For this example, suppose computing device 526 sent a request to the BMS 516 for buffer bandwidth of 40, and computing device 527 sent a request to the BMS 516 for buffer bandwidth of 50. In this example, the baseline bandwidths are 300 and 300 for a total of 600. Since the total available bandwidth is 1100, this means there is 1100–600=500 available buffer bandwidth.

According to expression (1), the total allocatable buffer bandwidth for ChildTask_1_3 is 500*(⅔)=333, and the total allocatable buffer bandwidth for ChildTask_2_1 is 500*(⅓)=167. Next, according to expression (2), the requested buffer of 40 for ChildTask_1_3 is less than the allocatable buffer of 333, so the final buffer for ChildTask_1_3 will be the requested buffer of 40. Likewise, according to expression (2), the requested buffer of 50 for ChildTask_2_1 is less than the allocatable buffer of 167, so the final buffer for ChildTask_2_1 will be the requested buffer of 50.

Figure 10:
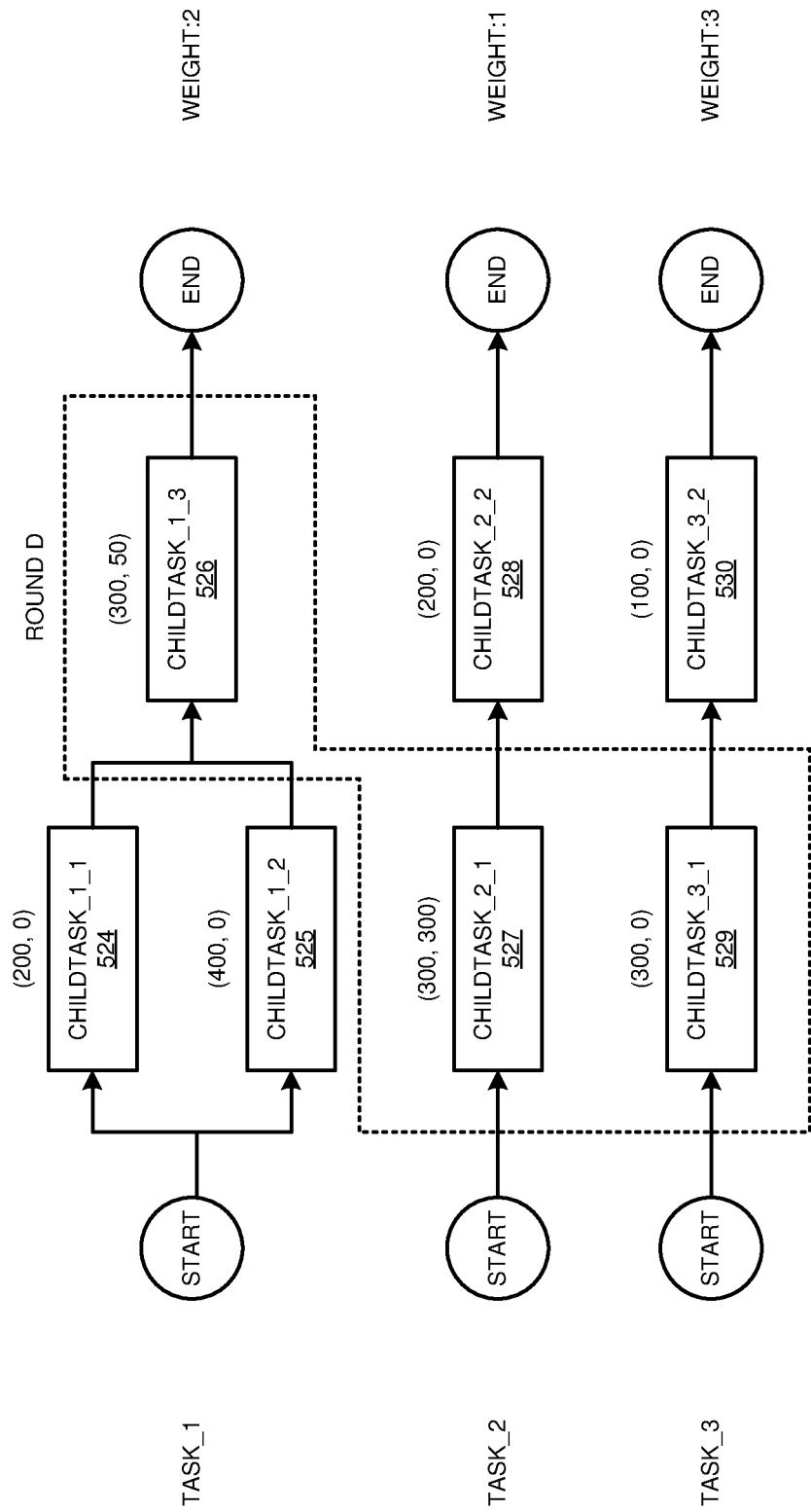
FIG. 10 depicts a block diagram of computing devices with example task and bandwidth assignments during a fourth round in accordance with an illustrative embodiment.

With reference to FIG. 10, this figure depicts a block diagram of computing devices 524-530 with example task and bandwidth assignments during a fourth round in accordance with an illustrative embodiment. In the illustrated embodiment, the computing devices 524-530 correspond with computing devices 524-530 of FIG. 5.

In the illustrated embodiment, three child tasks are in progress during a fourth time period designated as Round D. This illustrates an example of an additional child task being added to a time period compared to the number of child tasks being performed during a previous time period. FIG. 10 also shows an example of the total baseline bandwidths plus the total requested bandwidths exceeding the total bandwidth of 1100 (300+300+300+50+300=1250).

For this example, suppose computing device 526 sent a request to the BMS 516 for buffer bandwidth of 50, and computing device 527 sent a request to the BMS 516 for buffer bandwidth of 300. In this example, the baseline bandwidths are 300 for ChildTask_1_3, 300 for ChildTask_2_1, and 300 for ChildTask_3_1, for a total of 900. Since the total available bandwidth is 1100, this means there is 1100−900=200 available buffer bandwidth.

According to expression (1), the total allocatable buffer bandwidth for ChildTask_1_3 is 200*(2/6)=67, and the total allocatable buffer bandwidth for ChildTask_2_1 is 200*(1/6)=33. Next, according to expression (2), the requested buffer of 50 for ChildTask_1_3 is less than the allocatable buffer of 67, so the final buffer for ChildTask_1_3 will be the requested buffer of 50.

According to expression (2), the requested buffer of 300 for ChildTask_2_1 is greater than the allocatable buffer of 67, so the final buffer for ChildTask_2_1 will be the allocatable buffer. Earlier, the allocable buffer for ChildTask_2_1 was found to be 33. However, this value was calculated according to the weight ration of ChildTask_2_1 to the total weights of all child tasks being performed in this round. However, since ChildTask_1_3 is allocated less than the total allocatable amount and the ChildTask_3_1 is requesting no buffer, the total allocatable for ChildTask_2_1 now rises to the total available buffer bandwidth of 200, minus the buffer allocated to ChildTask_1_3 of 50, which is 150. Since the requested buffer of 300 for ChildTask_291 is greater than the allocatable buffer of 150, the final buffer for ChildTask_2_1 will be the allocatable buffer of 150.

Figure 11:
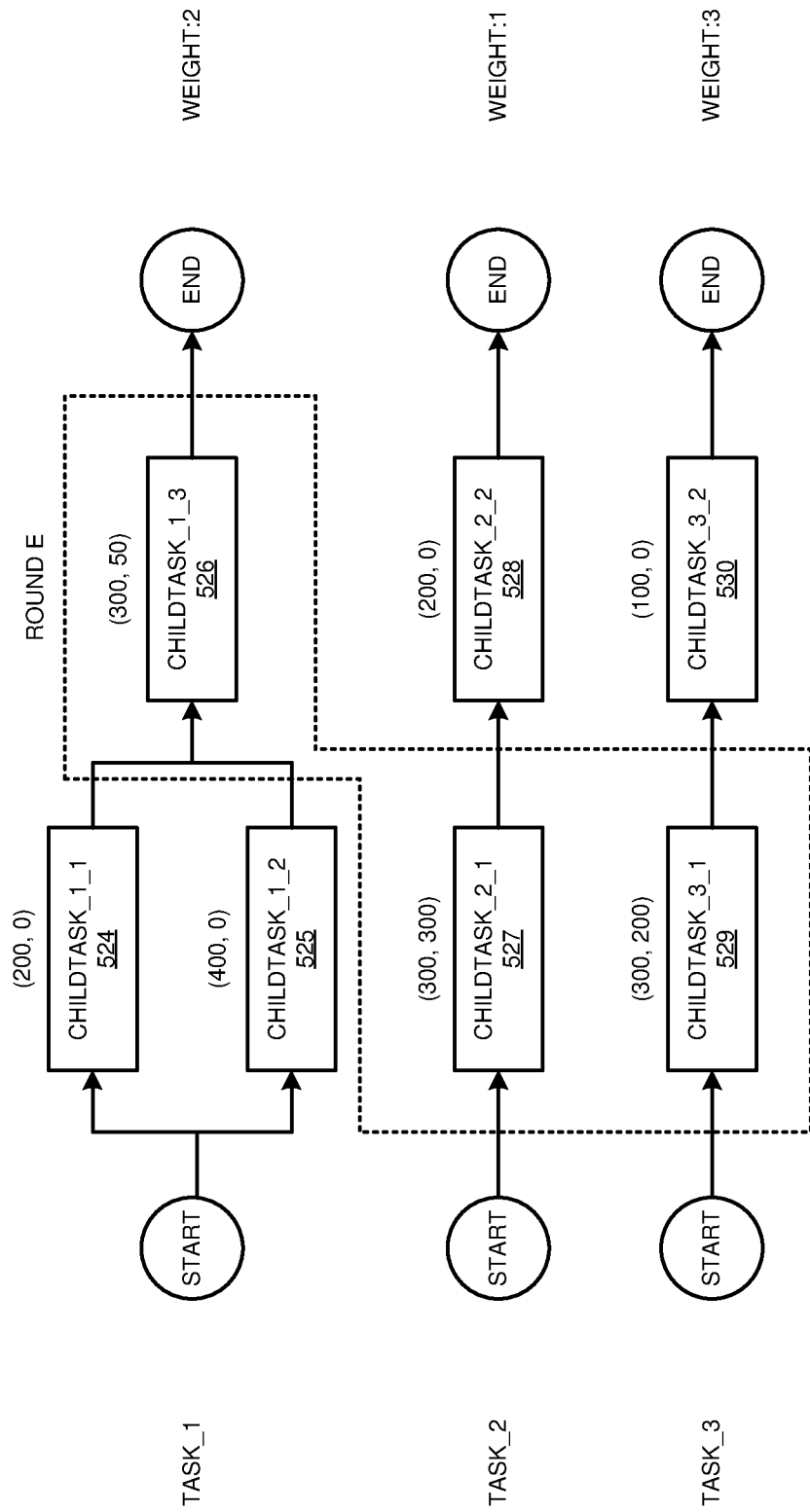
FIG. 11 depicts a block diagram of computing devices with example task and bandwidth assignments during a fifth round in accordance with an illustrative embodiment.

With reference to FIG. 11, this figure depicts a block diagram of computing devices 524-530 with example task and bandwidth assignments during a fifth round in accordance with an illustrative embodiment. In the illustrated embodiment, the computing devices 524-530 correspond with computing devices 524-530 of FIG. 5.

In the illustrated embodiment, three child tasks are in progress during a fifth time period designated as Round E. This illustrates another example of the total baseline bandwidths plus the total requested bandwidths exceeding the total bandwidth of 1100 (300+300+300+50+300+200=1450).

For this example, suppose computing device 526 sent a request to the BMS 516 for buffer bandwidth of 50, computing device 527 sent a request to the BMS 516 for buffer bandwidth of 300, and computing device 529 sent a request to the BMS 516 for buffer bandwidth of 200. In this example, the baseline bandwidths are 300 for ChildTask_1_3, 300 for ChildTask_2_1, and 300 for ChildTask_3_1, for a total of 900. Since the total available bandwidth is 1100, this means there is 1100−900=200 available buffer bandwidth.

According to expression (1), the total allocatable buffer bandwidth for ChildTask_1_3 is 200*(2/6)=67, the total allocatable buffer bandwidth for ChildTask_2_1 is 200*(1/6)=33, and the total allocatable buffer bandwidth for ChildTask_1_3 is 200*(3/6)=100. Next, according to expression (2), the requested buffer of 50 for ChildTask_1_3 is less than the allocatable buffer of 67, so the final buffer for ChildTask_1_3 will be the requested buffer of 50.

As before in connection with FIG. 10, since the allocated buffer (50) for ChildTask_1_3 is less than the allocatable buffer (67), the unallocated amount is added back to the allocatable bandwidth for use in calculating buffer for tasks in which the requested buffer exceeds the allocatable buffer. This this case, the requested buffer for both the ChildTask_2_1 and the ChildTask_3_1 exceeds the allocatable buffer. Thus, the allocatable buffer is divided between these two child tasks proportionate to the weights of the tasks. Thus, the total allocatable buffer is now 200 minus the 50 allocated to ChildTask_1_1, leaving a total allocatable of 150. The final buffer for ChildTask_2_1 will be 150*(1/4)=37, and the final buffer for ChildTask_3_1 will be 150*(3/4)=113.

Figure 12:
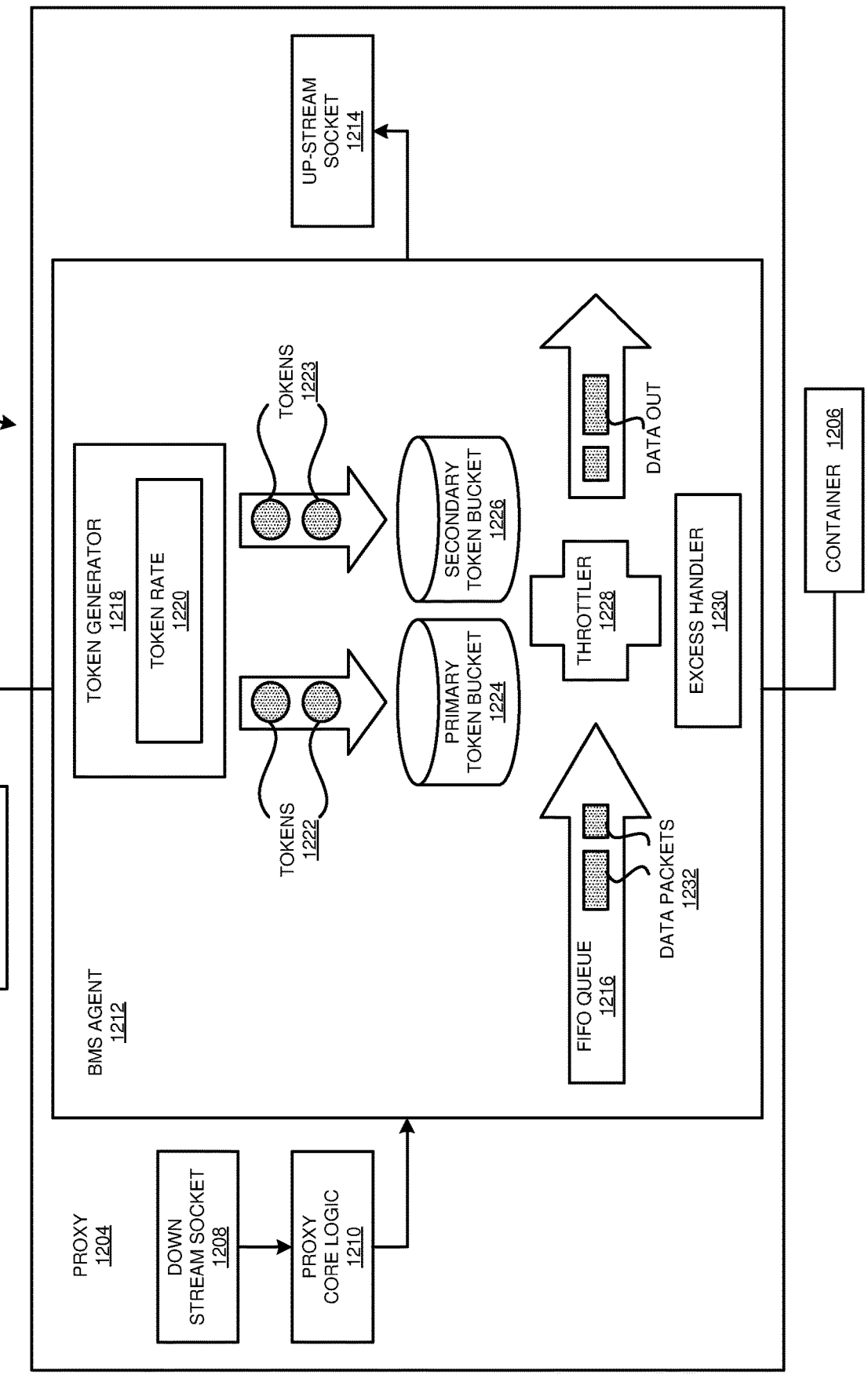
FIG. 12 depicts a block diagram of an example edge computing environment in accordance with an illustrative embodiment.

With reference to FIG. 12, this figure depicts a block diagram of an example edge computing environment 1200 in accordance with an illustrative embodiment. The edge computing environment 1200 includes a BMS 1202 in communication with a proxy 1204 and container 1206. In a particular embodiment, the BMS 1202 is an example of the BMS 516 of FIG. 5. The proxy 1204 and the container 1206 are representative of the proxy 532 and container 534 of any of the edge devices 506 of FIG. 5, including any of the computing devices 524-530 of FIG. 5. In the illustrated embodiment, the proxy 1204 includes a BMS agent 1212, which is an example of the BMS agent 536 of any of the edge devices 506 of FIG. 5, including any of the computing devices 524-530 of FIG. 5.

In the illustrated embodiment, the BMS agent 1212 receives data packets 1232 associated with an assigned task and throttles the data packets 1232 according to allocated baseline bandwidth and buffer bandwidth. Data packets 1232 are received by the BMS agent 1212 from a downstream socket 1208 and various proxy core logic 1210 and placed in a first in first out (FIFO) queue 1216. The data packets 1232 in the FIFO queue 1216 are flow rate controlled by a throttler 1228 of the BMS agent 1212. Data packets 1232 that are propagated or throttled by the throttler 1228 are sent out of the BMS agent 1212 towards an up-stream socket 1214. The BMS agent 1212 further includes a token generator 1218 for generating primary tokens 1222 and secondary tokens 1223 at token rates controlled by token rate module 1220. The token generator 1218 generates the primary tokens 1222 into a primary token bucket 1224, which holds or keeps a count of all the primary tokens 1222. The token generator 1218 also generates the secondary tokens 1223 into a secondary token bucket 1226, which holds or keeps a count of all the secondary tokens 1223. An excess handler 1230 of the BMS agent 1212 handles any data packets 1232 that are not received or not rate controlled by the throttler 1228.

In the illustrated embodiment, the BMS agent 1212 uses the primary token bucket 1224 to enforce the allocated baseline bandwidth and uses the secondary token bucket to enforce the allocated buffer bandwidth. At the beginning of each round, the BMS agent 1212 receives allocated primary tokens 1222 for the current round and starts to propagate the corresponding amount of data packets 1232. Also, at the beginning of each round, the BMS agent 1212 issues a request to the BMS 1202 for future rounds, if necessary. The exact correlation between the tokens and the bandwidths may vary and may be implementation specific depending on such things as user preference or typical packet size. For example, in some embodiments, the tokens 1222 and 1223 may correlate to a volume of data, such as one token per byte, one token per kilobyte, or some other unit of measure. The BMS 1202 calculates the tokens 1223 as buffer allocations for future rounds as discussed above in connection with expressions (1) and (2), and then responds with allocated tokens for the future rounds. These tokens are stored in a token allocation table of the token rate module 1220 where they are associated with the respective rounds for which they were allocated by the BMS 1202. These future-allocated tokens represent buffer allocated bandwidth represented in expression (1) as Buffer Allocated.

In some embodiments, at the beginning of each round, a new data structure is created for the current+(maximum allocated rounds)−1 round. For example, in some embodiments, the BMS agent 1212 may allocate tokens for a maximum of four rounds, so at the beginning of round 10, the BMS agent 1212 creates a new data structure for the 20+(4)−1=23 round. The newly created round data structure inherits the child task entries from the previous round. In some embodiments, the data structures include an estimated amount of total pending data to process at the beginning of the associated round. The BMS agent 1212 calculates the pending data for the new round data structure using the pending data value from the previous round, and subtracting the product of the baseline bandwidth and the round time. If the estimated amount of pending data is zero or less than zero, the new round data structure will exclude that child task entry.

Figure 13:
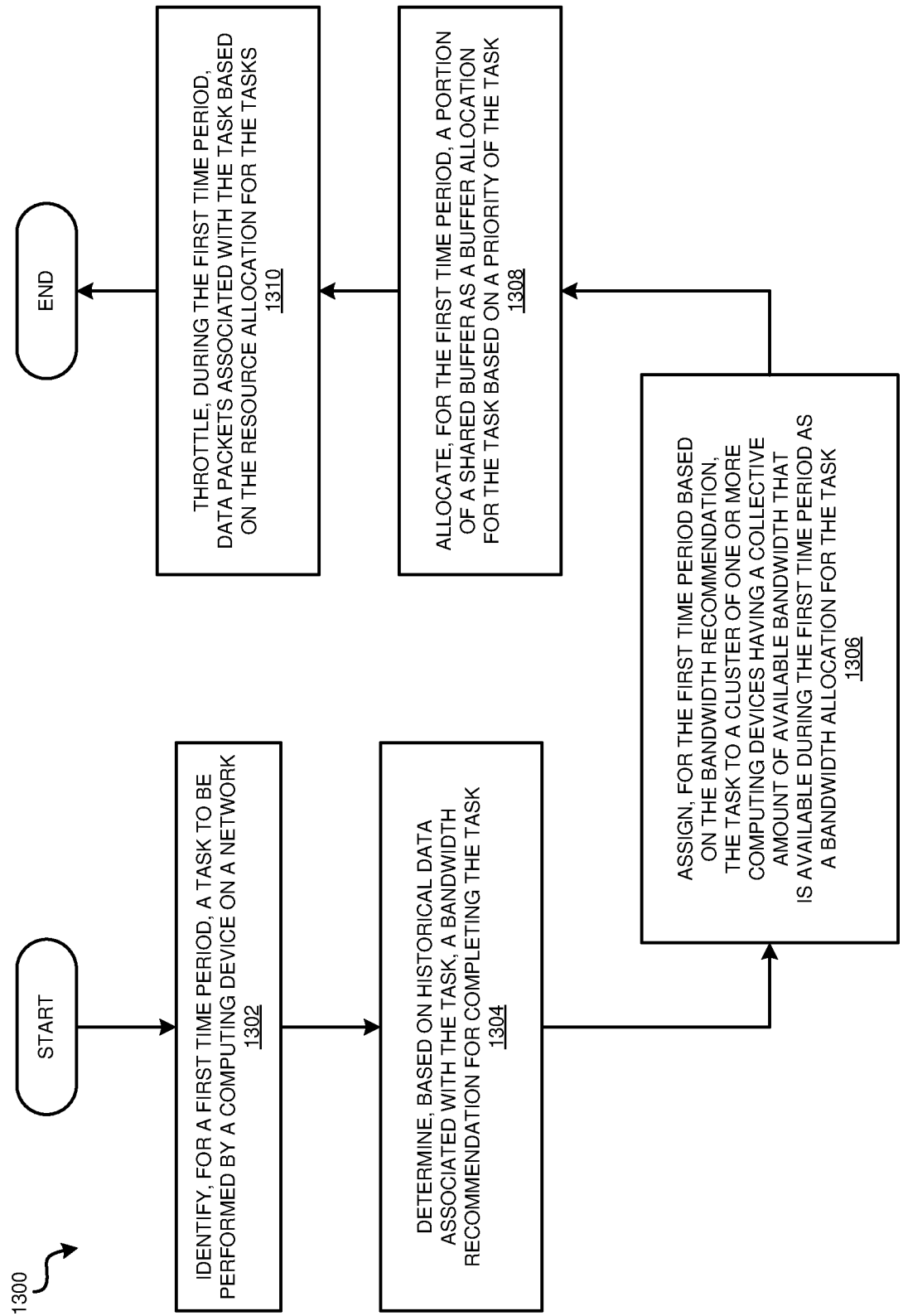
FIG. 13 depicts a flowchart of an example process for dynamic allocation of edge network resources in accordance with an illustrative embodiment.

With reference to FIG. 13, this figure depicts a flowchart of an example process 1300 for dynamic allocation of edge network resources in accordance with an illustrative embodiment. In a particular embodiment, the resource allocation system 314 of FIG. 3 carries out the process 1300.

In an embodiment, at block 1302, the process identifies, for a first time period, a task to be performed by a computing device on a network. Next, at block 1304, the process determines, based on historical data associated with the task, a bandwidth recommendation for completing the task. Next, at block 1306, the process assigns, for the first time period based on the bandwidth recommendation, the task to a cluster of one or more computing devices having a collective amount of available bandwidth that is available during the first time period as a bandwidth allocation for the task. Next, at block 1308, the process allocates, for the first time period, a portion of a shared buffer as a buffer allocation for the task based on a priority of the task, wherein the buffer allocation combines with the bandwidth allocation as a resource allocation. Next, at block 1310, the process throttles, during the first time period, data packets associated with the task based pm the resource allocation for the task.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM) or Flash memory, a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
assigning, for a first time period, a specific task to a first computing device on a network;
allocating, for the first time period, and based on a baseline bandwidth recommendation for a type of the specific task, a first baseline bandwidth to the first computing device;
allocating, for the first time period, a portion of a shared buffer bandwidth as a first buffer bandwidth to the first computing device, wherein the first buffer bandwidth combines with the first baseline bandwidth as a first total bandwidth for the specific task; and
throttling, during the first time period, data packets associated with the specific task based on the first total bandwidth for the specific task,
wherein the throttling includes determining whether to propagate or delay the data packets associated with the specific task using a primary token bucket that is paired with a secondary token bucket.

2. The method of claim 1, wherein the network is an edge network comprising an edge device as the first computing device.

3. The method of claim 1, further comprising:
collecting, prior to the first time period, network data associated with tasks as the tasks are being performed using the network; and
deriving network performance metrics for each of the tasks using the associated network data.

4. The method of claim 3, further comprising:
predicting a bandwidth allocation for the type of the specific task using a mathematical model, wherein the mathematical model outputs the bandwidth allocation using at least one network performance metric associated with the type of the specific task.

5. The method of claim 1, further comprising:
defining a computing device cluster comprising the first computing device and a second computing device on the network,
wherein the assigning of the specific task to the first computing device comprises assigning the specific task to the computing device cluster.

6. The method of claim 5, further comprising:
allocating, for the first time period based on the baseline bandwidth recommendation, a second baseline bandwidth to the second computing device.

7. The method of claim 1, further comprising:
determining, for the first time period, the shared buffer bandwidth as an amount of total bandwidth remaining after allocating bandwidths for each task to be performed during the first time period.

8. The method of claim 7, further comprising:
comparing a requested buffer bandwidth to an allocatable buffer bandwidth, wherein the requested buffer bandwidth is requested for the first computing device during the first time period, and wherein the allocatable buffer bandwidth is a portion of the shared buffer bandwidth that is proportionate to a weight value assigned to the specific task.

9. The method of claim 8, further comprising:
identifying a lesser of the requested buffer bandwidth and the allocatable buffer bandwidth as the portion of the shared buffer bandwidth to be allocated as the first buffer bandwidth to the first computing device during the first time period.

10. The method of claim 9, further comprising:
allocating, for the first time period, at least a portion of a difference between the requested buffer bandwidth and the allocatable buffer bandwidth to a second computing device on the network.

11. The method of claim 1, further comprising:
allocating, for the first time period, a first number of tokens to a standard token bucket based on the first baseline bandwidth; and
allocating, for the first time period, a second number of tokens to a dynamic token bucket based on the first buffer bandwidth.

12. The method of claim 11, wherein the throttling of data packets associated with the specific task comprises checking a current number of tokens in the standard token bucket and in the dynamic token bucket and propagating data packets on the network only if the current number of tokens satisfies a threshold number of tokens.

13. A computer program product comprising one or more computer readable storage media, and program instructions collectively stored on the one or more computer readable storage media, the program instructions executable by a processor to cause the processor to perform operations comprising:
assigning, for a first time period, a specific task to a first computing device on a network;
allocating, for the first time period, and based on a baseline bandwidth recommendation for a type of the specific task, a first baseline bandwidth to the first computing device;
allocating, for the first time period, a portion of a shared buffer bandwidth as a first buffer bandwidth to the first computing device, wherein the first buffer bandwidth combines with the first baseline bandwidth as a first total bandwidth for the specific task; and
throttling, during the first time period, data packets associated with the specific task based on the first total bandwidth for the specific task,
wherein the throttling includes determining whether to propagate or delay the data packets associated with the specific task using a primary token bucket that is paired with a secondary token bucket.

14. The computer program product of claim 13, wherein the stored program instructions are stored in a computer readable storage device in a data processing system, and wherein the stored program instructions are transferred over a network from a remote data processing system.

15. The computer program product of claim 13, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and program instructions to generate an invoice based on the metered use.

16. The computer program product of claim 13, further comprising:
    allocating, for the first time period, a first number of tokens to a standard token bucket based on the first baseline bandwidth; and
    allocating, for the first time period, a second number of tokens to a dynamic token bucket based on the first buffer bandwidth.

17. The computer program product of claim 16, wherein the throttling of data packets associated with the specific task comprises checking a current number of tokens in the standard token bucket and in the dynamic token bucket and propagating data packets on the network only if the current number of tokens satisfies a threshold number of tokens.

18. A computer system comprising a processor and one or more computer readable storage media, and program instructions collectively stored on the one or more computer readable storage media, the program instructions executable by the processor to cause the processor to perform operations comprising:
    assigning, for a first time period, a specific task to a first computing device on a network;
    allocating, for the first time period, and based on a baseline bandwidth recommendation for a type of the specific task, a first baseline bandwidth to the first computing device;
    allocating, for the first time period, a portion of a shared buffer bandwidth as a first buffer bandwidth to the first computing device, wherein the first buffer bandwidth combines with the first baseline bandwidth as a first total bandwidth for the specific task; and
    throttling, during the first time period, data packets associated with the specific task based on the first total bandwidth for the specific task,
    wherein the throttling includes determining whether to propagate or delay the data packets associated with the specific task using a primary token bucket that is paired with a secondary token bucket.

19. The computer system of claim 18, further comprising:
    allocating, for the first time period, a first number of tokens to a standard token bucket based on the first baseline bandwidth; and
    allocating, for the first time period, a second number of tokens to a dynamic token bucket based on the first buffer bandwidth.

20. The computer system of claim 19, wherein the throttling of data packets associated with the specific task comprises checking a current number of tokens in the standard token bucket and in the dynamic token bucket and propagating data packets on the network only if the current number of tokens satisfies a threshold number of tokens.

* * * * *